United States Patent [19]
Crane et al.

[11] Patent Number: 5,784,612
[45] Date of Patent: Jul. 21, 1998

[54] CONFIGURATION AND UNCONFIGURATION OF DISTRIBUTED COMPUTING ENVIRONMENT COMPONENTS

[75] Inventors: Christina Heidi Crane, Austin; Edwin Michael Philpot, Jr., Leander; Stephna Jeanne Sirkin; Kenneth Walker, Jr., both of Austin, all of Tex.

[73] Assignee: International Business Machines Corporation, Armonk, N.Y.

[21] Appl. No.: 433,176

[22] Filed: May 3, 1995

[51] Int. Cl.$^6$ ................................................ G06F 9/44
[52] U.S. Cl. ................................................ 395/653
[58] Field of Search ........................ 395/650, 700, 395/800, 491, 611, 653

[56] References Cited

U.S. PATENT DOCUMENTS

| | | | |
|---|---|---|---|
| 4,091,455 | 5/1978 | Woods et al. | 395/183.01 |
| 4,104,721 | 8/1978 | Markstein | 395/375 |
| 4,430,727 | 2/1984 | Moore et al. | 711/115 |
| 4,933,838 | 6/1990 | Elrod | 395/182.01 |
| 5,014,193 | 5/1991 | Garner et al. | 395/830 |
| 5,018,096 | 5/1991 | Aoyama | 395/491 |
| 5,032,979 | 7/1991 | Hecht et al. | 395/187.01 |
| 5,138,706 | 8/1992 | Melo et al. | 395/500 |
| 5,226,172 | 7/1993 | Seymour et al. | 395/800 |
| 5,317,693 | 5/1994 | Cuenod et al. | 395/829 |
| 5,410,691 | 4/1995 | Taylor | 395/650 |
| 5,455,953 | 10/1995 | Russell | 395/650 |
| 5,526,358 | 6/1996 | Gregson et al. | 395/200.51 |
| 5,586,260 | 12/1996 | Hu | 395/187.01 |
| 5,671,414 | 9/1997 | Nicolet | 395/653 |

*Primary Examiner*—James P. Trammell
*Assistant Examiner*—John Q. Chavis
*Attorney, Agent, or Firm*—Jeffrey S. LaBaw; David H. Judson

[57] ABSTRACT

Methods of configuring and unconfiguring resources in and from a distributed computing environment are effected by identifying those configuration/unconfiguration tasks which must be carried out locally (that is, on the resource being configured/unconfigured) and then enforcing the cell administrator's preexisting restriction on root user access to the machine at least with respect to the identified local configuration/unconfiguration task.

19 Claims, 2 Drawing Sheets

CONFIGURATION AND UNCONFIGURATION OF DISTRIBUTED COMPUTING ENVIRONMENT COMPONENTS

TECHNICAL FIELD

The present invention relates generally to computing networks and more particularly to methods for securely configuring and unconfiguring resources in a distributed computing environment domain.

BACKGROUND OF THE INVENTION

It is well known to interconnect multiple computers into a local area network (LAN) to enable such computers to exchange information and share resources. A local area network provides a distributed computing environment in which users can access distributed resources and process applications on multiple computers.

A known distributed computing environment, called DCE, has been implemented using software available for the Open Systems foundation (OSF). In a distributed computing environment, a group of machines is typically referred to as a "domain." An OSF DCE domain is called a "cell." A DCE cell can be a complex environment involving hundreds of machines in disparate locations throughout the world. Typically, a DCE cell administrator is responsible for configuring each of the host machines to perform its assigned role in the cell, and for unconfiguring a machine from the cell when necessary. Thus, for example, a machine may be configured as a new client in the domain, or an existing DCE security client may be configured as a DCE CDS client or a DCE DTF client. The parallel process of "unconfiguration" generally involves moving a machine out of the DCE cell, and usually involves removing configuration-related information from various domain resources. Examples of unconfiguration include physically moving a machine to a new location (thus requiring a new ip address), disabling a machine, or reconfiguring a machine using different parameters.

Although a DCE cell often includes some number of server machines, most of the machines in the cell will be configured as client machines. Configuration and unconfiguration services require the DCE cell administrator to log onto the client machine as the root user in order to perform certain tasks. This causes a security exposure by allowing the cell administrator access to the whole client machine, rather than access to just the data and processes related to DCE. On the other hand, if the root user is provided with the cell administrator's password in order to facilitate the particular service, then there is a security exposure within the DCE cell, because someone who should just have user access then has "super-user" access.

There remains a need to provide techniques for configuring and unconfiguring resources in a distributed computing environment that solves this security problem.

BRIEF SUMMARY OF THE INVENTION

It is thus a primary object of the present invention to describe secure methods of configuring and unconfiguring resources in a distributed computing environment domain.

It is a another object of the invention to describe a method for configuring a client machine into a distributed computing environment wherein certain configuration tasks are divided between persons having different user authorities not generally granted to the same person.

It is a further object to provide a method for unconfiguring a client machine from a distributed computing environment where certain unconfiguration tasks are divided between such persons having different user authorities.

It is still another object of this invention to provide secure configuration/unconfiguration of a DCE resource by eliminating the cell administrator's root user access to the resource being configured/unconfigured for at least one configuration/unconfiguration task. The at least one task is performed by the root user locally at the resource being configured/unconfigured.

It is yet another more particular object of the invention to provide a method of configuring a machine in a distributed computing environment wherein the machine is configured in a two-step process: an "administrative" configuration performed by the cell administrator from any machine already in the domain, and a "local" configuration performed by the root user on the machine being configured. A machine is unconfigured from the domain preferably using a similar two-step process, although the particular order of the admin and local unconfiguration steps need not be enforced in any specific way.

It is another object of this particular invention to provide such "split" configuration and unconfiguration in an OSF DCE cell, although the teachings herein are applicable to any distributed computing environment.

In one illustrative embodiment, a method of configuring a machine into a distributed computing environment domain is described. The domain has at least two levels or "divisions" of authority, a first level authority (e.g., a cell administrator in OSF DCE) who normally does not have root user access to machines in the domain, and a second level authority (i.e. the root user) normally having access only to his or her machine. In the prior art, the first level authority was able to obtain and was required to have root user access to the machine being configured into the domain. According to the inventive method, however, the first level authority's lack of normal root user access to machines in the domain is maintained and enforced with respect to at least one configuration task that must be carried out on the machine being configured. With this constraint, a so-called "split" configuration is then carried out by having the first level authority update the domain with information about the machine being configured, and then having the root user perform the at least one configuration task. Thus, according to the preferred method, there is a division of configuration tasks into two distinct segments which require different user authorities not generally granted to the same person. This division makes it easier for the first level authority to control the state of its DCE domain, and it makes it easier for the root user to control the state of his or her individual computer. As a by-product, the security of all machines participating in the cell is increased by substantially eliminating root user access by persons with the first level authority's password.

According to a parallel embodiment, a method of unconfiguring a machine from the domain is also implements by identifying at least one unconfiguration task that must be carried out locally (i.e. at the machine being unconfigured), and then enforcing the normal restriction imposed on the first level authority's root user access to the machine being unconfigured. A "split" unconfiguration is then carried out, typically by having the root user perform the at least one unconfiguration task, and then having the first level authority update the domain by removing the information about the machine being unconfigured.

The foregoing has outlined some of the more pertinent objects of the present invention. These objects should be construed to be merely illustrative of some of the more prominent features and applications of the invention. May other beneficial results can be attained by applying the disclosed invention in a different manner or modifying the invention as will be described. Accordingly, other objects and a fuller understanding of the invention may be had by referring to the following Detailed description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
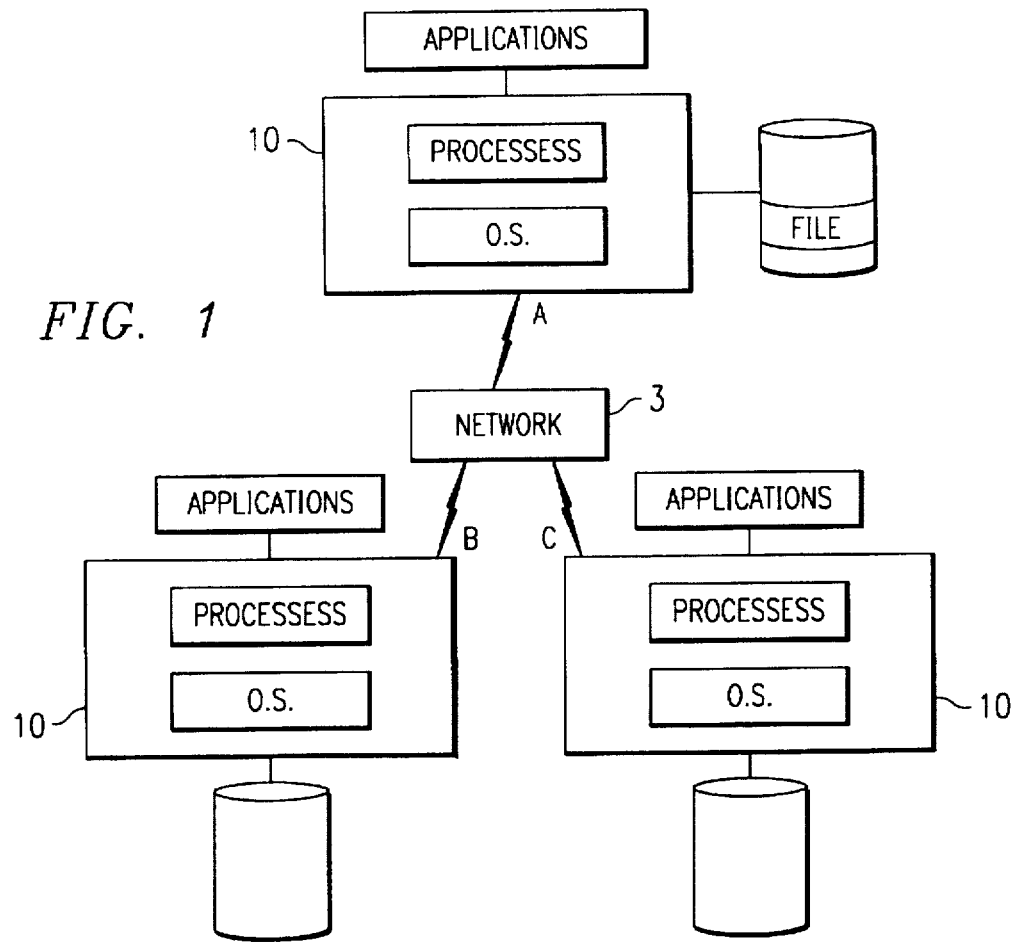
FIG. 1 illustrates a computer network in which the present invention is implemented.

A known distributed computing environment (DCE) is illustrated in FIG. 1 and includes two or more nodes, A, B and C connected through a communication link or network 3. The network 3 can be a local area network (LAN) or a wide area network (WAN), the latter comprising a switched or leased teleprocessing (TP) connection to other nodes or to a network of systems operating under a known computer architecture. At any of the nodes A, B or C there may be a processing system 10A, 10B or 10C. Each of these systems may be a single user system or a multi-user system. Each of the processing systems may operate as a client or server, depending on whether it is requesting or supplying services.

Each of the proceeding systems is a computer, referred to herein sometimes as a "machine". For example, each computer may be a RISC System/6000® (a reduced instruction set or so-called RISC-based workstation) running the AIX® (Advanced Interactive Executive) operating system. The AIX® operating system is compatible at the application interface level with AT&T's UNIX operating system, version 5.2. The various models of the RISC-based personal computers are described in many publications of the IBM Corporation, for example, *RISC System/6000, 7073 and 6016 POWERstation and POWERserver Hardware Technical Reference*, Order No. SA23-2644-00. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986). Alternatively, each computer may be an IBM® PS/2® running under the OS/2® operating system. For more information on the PS/2 line of computers and the OS/2 operating system, the reader is directed to *Technical Reference Manual Personal Systems/2 Model 50, 60 Systems IBM Corporation*, Part No. 68x2224 Order Number S68X-2224 and *OS/2 2.0 Technical Library, Programming Guide Volumes 1–3 Version 2.00*, Order Nos. 10G6261, 10G6495 and 10G6494.

In one particular implementation, the invention runs on a plurality of IBM RISC System/6000 machines interconnected by IBM's Transmission Control Protocol/Internet Protocol (TCP/IP) architecture. TCP/IP uses as its link level Ethernet, a local area network (LAN) developed by Xerox corporation. A simplified description of local area networks may be found in a book by Larry E. Jordan and Bruce Churchill entitled *Communications and Networking for the IBM PC*, published by Robert J. Brady (a Prentice-Hall Company) (1983). Although the invention is described in the above-identified context, it should be appreciated that the teachings herein may be implemented using other and different computers interconnected by other networks than the Ethernet LAN or IBM's TCP/IP.

Figure 2:
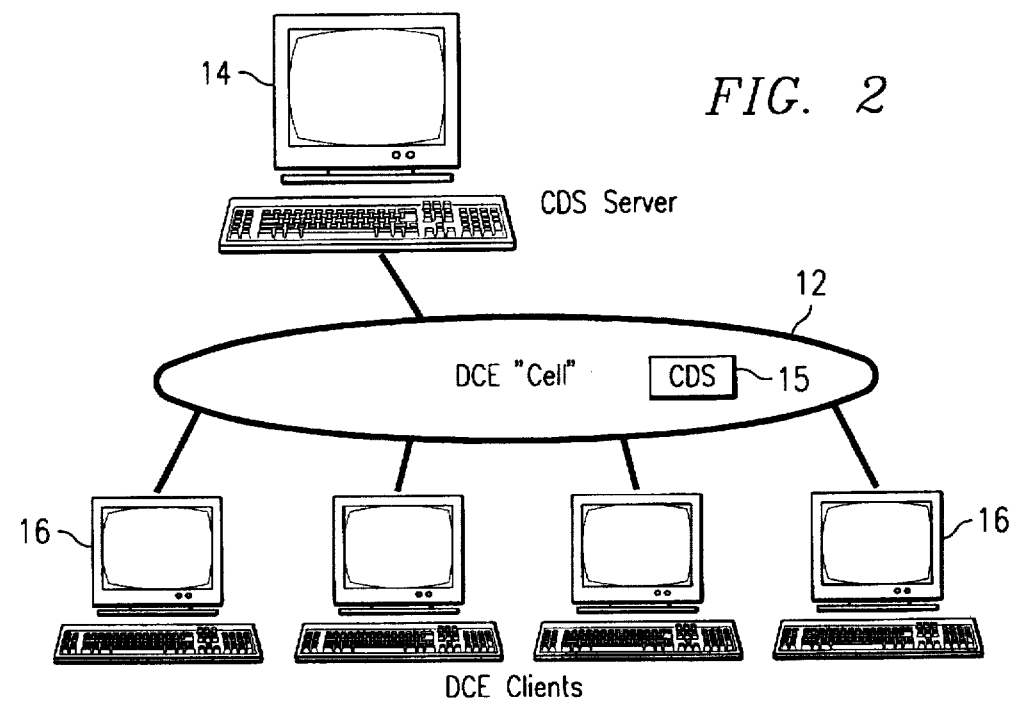
FIG. 2 illustrates a representative distributed computing domain of connected machines in which the invention is implemented.

Preferably, the invention is implemented in a distributed computing environment domain having any number of machines, and these machines may be located in different geographic locations. For illustrative purposes, the remainder of the detailed discussion is directed to a DCE domain or "cell", although the teachings of the invention are applicable to any distributed computing environment. FIG. 2 shows a representative DCE cell 12 in which the present invention is implemented. The cell 12 comprises of a set of connected machines, including at least one server 14 and the DCE clients 16, which share a common cell name and a namespace. Each cell provides a location independent namespace service called CDS, or Cell Directory Service 15. The naming service is used by application servers to store their location and interfaces, known as server bindings. The cell typically includes one or more server machines, such as Security Servers, Cell Directory Service (CDS) Servers and Time Servers, although most of the machines in the cell are client machines. One user of a client machine is referred to as a "root user", who accesses his or her individual computer using the root user identifier and the associated password.

Large computer networks such as the network shown in FIG. 2 typically have divisions of authority to allow flexibility in the setting up of and access to particular network resources. In the DCE cell of FIG. 2, there is typically a cell administrator who, although normally restricted from root user access to machines in the cell, has "super-user" access to cell resources regardless of the machine on which such resources are located. The cell administrator has access into the domain (via a cell administrator's identifier and an associated password) to obtain such "super-user" access to the cell resources from any machine in the cell. According to the invention, however, the normal restriction imposed on the cell administrator's ability to obtain root user access is maintained and enforced with respect to the machine being configured/unconfigured for at least the configuration/unconfiguration task(s) that must be performed on that machine.

Referring back to FIG. 2, machines may be configured or unconfigured from the cell. Thus, for example, a machine 14 may be configured as a new client in the domain, or an existing DCE security client may be configured as a DCE DTF client or a DCE security client. The parallel process of "unconfiguration" generally involves moving a machine out of the DCE cell, and usually involves removing configuration-related information from various domain resources. Examples of unconfiguration include physically moving a machine to a new location (thus requiring a new ip address), disabling a machine, or reconfiguring a machine using different parameters. In many cases, such configuration or unconfiguration services require the DCE cell administrator to log onto the client machine as a root user in order to perform certain tasks. This causes a security exposure by allowing the cell administrator access to the whole client machine, rather than access to just the data and processes related to DCE.

This problem is solved according to the invention by splitting the configuration or unconfiguration tasks, as the case may be, into preferably two distinct parts—those which require DCE cell administrator's authority (and password), and those which require root-user authority (and password). In this manner, the cell administrator's need to directly access all the machines in the DCE cell is eliminated, with certain advantageous results, as will be seen.

There is no particular restriction on the nature and scope of "configuration" services that are effected in the DCE cell. Such configuration tasks are required on an ongoing basis as changes are made to the cell. For example, a new machine may need to be added to the cell as a client, or it may be desired to configure a secondary CDS server to provide faster or more reliable access to the namespace. Other examples of configuration include configuring a Security Replica to provide faster access to security registry information, changing a type of time server, or updating a security client to also include a CDS client. Of course, numerous other reasons exist for configuration of call components, and the particular tasks themselves do not form part of the present invention.

According to the invention, it has been found desirable to identify those configuration tasks that must be performed locally, i.e. on the machine being configured into the domain, and then have the root user perform those tasks. The cell administrator's root user access restriction is maintained with respect to those tasks. Certain other configuration tasks, which typically include administrative functions that may be carried out from other machines in the domain, are performed by the cell administrator from some other already-configured machine (but not from the root user's machine being configured). In this way, the constraint that restrict's the cell administrator's root user access to the machine being configured is enforced. This "split" configuration approach is illustrated in the flowchart of FIG. 3 and described below.

Figure 3:
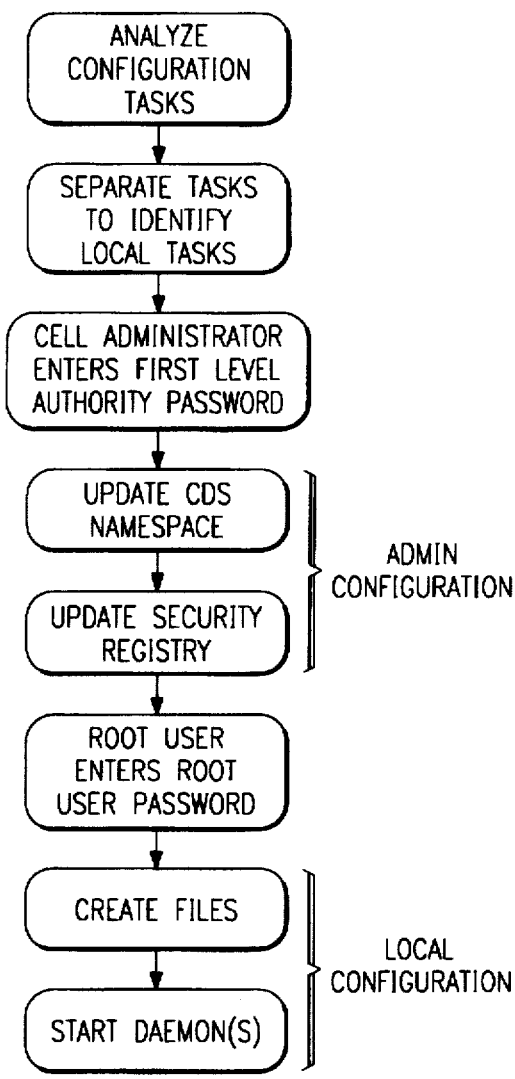
FIG. 3 is a flowchart representing a method of configuring a client machine into the domain of FIG. 2 using split configuration according to the teachings of the present invention.

Referring now to FIG. 3, by way of background, it is known that particular "components" of the distributed computing environment domain can be configured on a client machine. Each domain component has a set of configuration tasks associated therewith that must be carried out in order to effect the configuration. Each component has some tasks (of the overall set of configuration tasks) that must be done on the local machine being configured, while most components also have tasks that must be done by the cell administrator (although not on any particular machine). Thus, it is known that configuration usually involves two distinct sets of operations: tasks that require cell administrator authority within the DCE cell (e.g., updating the Security registry, the CDS namespace, the DFS Fileset Location Database, and DFS administration lists maintained on a remote system control machine); and tasks that require root user authority on the machine that is to be configured as a DCE client (e.g., creating configuration files and starting daemons).

According to the invention method of configuration shown in FIG. 3, configuration tasks are analyzed in step 30 to determine where the specific configuration task takes place for each DCE domain component. At step 32, tasks are separated and conveniently ordered into two separate columns, one column identifying the tasks that must be carried by the cell administrator and one column identifying those tasks that must be carried out on the local machine. A representative table is illustrated below:

| Domain Component | In the DCE cell (Cell administrator) | On the Local Machine (root user) |
|---|---|---|
| rpc (endpoint mapper) |  | XXX |
| sec_cl (security client) | XXX | XXX |
| cds_cl (cds client) | XXX | XXX |
| DTS_el (time client) |  | XXX |

An X in the table set forth above identifies the at least one configuration task. If the domain component has "X's" in more than one column, this indicates that the set of configuration tasks for that component include tasks that must be carried out locally, and tasks that the cell administrator must perform.

Thus, at step 32, the configuration tasks are divided into at least two distinct segments which require different user authorities not generally granted to the same person. Configuration will then involve two distinct or "split" steps. The method continues at step 34 with the DCE cell administrator entering his or her administrative password into the security registry of the domain, which is located on a machine previously configured into the cell. In response, the cell administrator can then perform "admin configuration" which, by way of this example, involves updating the cds namespace at step 36 and updating the security registry 38, in each case to include configuration-related information such as where to find the machine, how the machine is identified in the domain, etc. At step 40, the root user then enters the root user password to access the machine being configured. Then, the root user performs "local configuration" on the machine being configured. This, for example, typically involves the root user of the DCE client machine creating files on the local file system at step 42 and starting the client daemons at step 44. When both the admin and local pieces of configuration have been run, the result is the same as if a full client configuration is run.

As seen in FIG. 3, the admin portion of configuration is run before the local portion is run. It updates the security registry and cds namespace with information about the client machine being configured into the DCE cell. Before starting the tasks to admin configure a client, it is necessary to see if they have already been done. A procedure is used to query the cell to see if the appropriate entries have already been made. If so, those steps are not duplicated. The local files necessary for the client operations are then created on the local machine, if they do not already exist, and the appropriate DCE daemons are started if they are not already running. Although the local files can be created without any access to the DCE cell, the DCE client daemons must contact the DCE cell as they initialize.

Thus, according to the invention at least one of the configuration tasks that must be performed locally by the root user (i.e. at the machine being configured) is then carried out there by the root user. Standard root user access restrictions imposed on the cell administrator are maintained and enforced. Thus, root user access (which allows FULL access to the machine being configured) by persons with the DCE cell-administrator's identity, however, is eliminated with respect to this at least this one configuration task.

It may also be necessary to "unconfigure" DCE resources from the distributed computing environment cell of FIG. 2. In certain situations it is required to unconfigure (or remove configuration and database files for) a particular DCE or DFS component from a machine. For example, if it is desired to reconfigure a particular component with new parameters, one must unconfigure it to remove the existing configuration before setting up the new configuration. Or, if configuration of a component fails and it is only partially configured, one must remove the partial configuration before attempting configuration again. Alternatively, it may be necessary to unconfigure an entire machine (i.e., unconfigure all DCE components from the machine). For example, if it is desired to transfer a machine from one cell to another, one must remove the configurations for the old cell from the machine before setting up the configurations for the new cell. In rare cases, it may be desirable to unconfigure an entire cell.

According to the invention, it has been found desirable to identify those unconfiguration tasks that must be performed locally, i.e., on the machine being unconfigured from the domain, and then have the root user perform those tasks. Again, as with configuration, the normal root user access restriction imposed on the cell administrator is maintained. Other unconfiguration tasks, which typically include administrative functions that may be carried out from other machines in the domain, are performed by the cell administrator. In this way, the cell administrator's root user access to the machine being unconfigured is eliminated at least with respect to the local unconfiguration tasks. This "split" unconfiguration approach is illustrated in the flowchart of FIG. 4 and described below.

Figure 4:
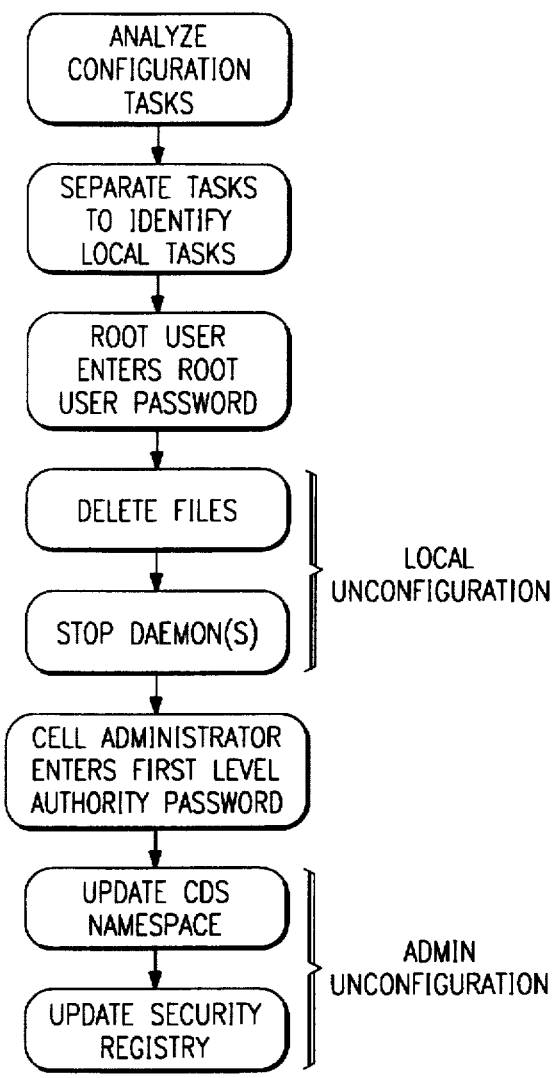
FIG. 4 is a flowchart detailing a method of unconfiguring a client machine from the domain of FIG. 2 using split unconfiguration according to the invention.

Referring now to FIG. 4, the method of unconfiguring a machine from the domain begins at step 50 by analyzing where the specific unconfiguration tasks take place for each DCE component. At step 52, tasks are separated again conveniently ordered into two separate columns, one column identifying the unconfiguration tasks that must be carried by the cell administrator and one column identifying those tasks that must be carried out on the local machine. A representative table is illustrated below:

| Domain Component | In the DCE cell (Cell administrator) | On the Local Machine (root user) |
| --- | --- | --- |
| rpc (remote procedure cell) | | XXX |
| sec_cl (security client) | XXX | XXX |
| cds_cl (cds client) | XXX | XXX |
| dts_cl (time client) | | XXX |
| cds_second,cds_srv (directory servers) | XXX | XXX |
| sec_srv (security server) | XXX | XXX |
| dts_srv (time server) | XXX | XXX |

Like configuration, the tasks required to unconfigure each DCE component (with a few exceptions) are separated at step 52 into two distinct parts—those which require DCE cell administrator's authority (and password), and those which require root-user authority (and password) on the local host. Unconfiguration will then involve two distinct or "split" steps. The method preferably continues at step 54 as the root user then enters the root user password to access the machine being unconfigured. Then, the root user performs "local unconfiguration" on the machine. This typically involves the root user of the DCE client machine deleting files from the local file system at step 56 and stopping client daemons at step 58. The method continues at step 60 with the DCE cell administrator entering his or her administrative password into the security registry. In response to such entry, the cell administrator then performs "admin unconfiguration" which, by way of this example, involves updating the cds namespace at step 62 and updating the security registry 64, in each case to delete or remove configuration-related information such as where to find the machine, how the machine is identified in the domain, etc.) When both the admin and local pieces of unconfiguration have been run, the result is the same as if a full client unconfiguration is run.

In the preferred embodiment, local unconfiguration is carried out before admin unconfiguration, although this is not a hard constraint that must be enforced. Thus, with respect to unconfiguration, the admin and local steps may be said to be "unordered" as the particular sequence is not critical.

This division of unconfiguration tasks allows a cell to be cleaned up if a machine has been physically removed from the cell before unconfiguration, allows the host machine to be cleaned up if it no longer has access to the cell, and closes the security exposure by limiting the cell administrator's needs to directly access all the machines in the DCE cell.

Just as configuration is separated into admin and local portions, so is most of unconfiguration. The exceptions are the master Security server (sec_srv) and any CDS server (cds_srv or cds_second) that contains a master replica of a directory in one of its clearinghouses. During admin unconfiguration, for example, the DCE cell administrator updates the cds namespace and security registry. During local unconfiguration, the root user of the machine to be unconfigured stops the DCE daemons and deletes the appropriate files on the local file system.

Thus, according to the invention split unconfiguration allows the root user to perform the unconfiguration steps on the local machine while the cell administrator cleans up the rest of the cell. A local unconfiguration is useful if the cell for which a machine is configured is inaccessible or the root user does not have the password for that cell administrator's account; in such case, the root user only has to remove the local configuration files from the machine to reconfigure it for a new cell. Local unconfiguration is also useful if the configuration of a machine is so broken that it cannot reach the Security server to be authenticated to perform remote operations, in which case the root user can limit unconfiguration to local items. Also, local unconfiguration is useful to enforce unconfiguration of a CDS server that contains the master replica of a directory.

The following sections provide detailed procedures for performing configuration tasks.

CONFIGURING DCE/DFS CLIENTS

Client configuration for sec_cl and cds_cl is preferably a two-part process. (The cell administrator may not have root access to the client machines, or the root user may not have cell administrator access.) The two parts are the following:

The cell administrator runs the admin portion from any machine in the cell to update the namespace and security registry.

The root users of the client machine runs the local portion to create necessary files and to start client daemons for all client components.

According to the preferred embodiment, the mkdce command is used as the tool to configure DCE components. The format of this command is set forth in detail below.

mkdce [-n cell_name] [-h dce_hostname] [-a cell_admin] [-s security_server] [-c cds_server ] [-P min_principal_id] [-G min_group_id] [-O min_org_id] [-M max_UNIX_id] [-p profile] [-t time_courier_role] [-R] [-r sec_rep_name] [-o fulll-o locall-o admin -i machine identifier] component.

Configuring clients

Admin Configure a Client:

mkdce -o admin -i identifier [-h dce_hostname] [-a cell_admin] [-p lan_profile ] cds_cllsec_cl Local Configure a Client:

mkdce -o local [-h dce_hostname] [-n cellname] [-s sec_server] [-c cds-server] client_components Full Configure a Client:

mkdce [-o full] [-h dce_hostname] [-a cel_admin] [-n cell_name] [-s sec_server] [-c cdsl_server] [-p lan_profile] client_components Configuring Security Servers:

Configure a Master Security Server:

mkdce [-n cellname [-a cell_admin] [P min_princ_id] [-G min_group_id] [O min_org_id] [-M max_unix_id] sec_srv Configuring CDS Servers:

Configure an Initial CDS Server:

mkdce [-a cell_admin] [-n cellname] [-s sec_server] [-h dce_hostname] [-p lan_profile] cds_srv Configure an Additional CDS Server:

mkdce [-a cell_admin] [-n cellname] [-s sec_server] [-c cds_server] [-h dce_hostname] [-p lan_profile ] cds_second Configuring DTS Servers:

Configure a DTS Server:

mkdce [-t courier|noncourier|backup] [-a cell_admin] [-n cellname] [-h dce_hostname} [-p lan_profile] [-c cds_server] [-s sec_server] dts_local|dts_global Configuring the Global Directory Agents:

Configure a Global Directory Agent:

mkdce [-a cell_admin] [-n cellname] [-s sec_server] [-c sec_server] [-h dce_hostname] [-p lan_profile] gda Options -a cell_admin Specifies the name of the cell administrator's account. When configuring the Master Security Server (the sec-srv component), the mkdce command gives this account privileges throughout the cell. Otherwise, the account name must have sufficient privilege to perform configuration tasks within the cell. If no -a option is specified, the account cell_admin will be assumed. The value for cell-admin is used by all components except rpc.

-c cds_server Specifies the TCP/IP hostname or TCP/IP address of a CDS server, if none are located on the same LAN as the current machine. This option should be used for all components except rdc, the initial sec_srv, and the initial cds_serv. If no -c option is specified and the local machine is separated from all CDS servers by a router or gateway that doe snot pass broadcast packets, CDS cannot be configured correctly.

-G min_group_id Specifies the starting point (minimum UNIX ID) for UNIX Ids automatically generated by the Security Service when groups are added with the rgy_edit command. The default is 100.

-h dce_hostname Specifies the identifying name within the cell of the machine being configured. This can be the same as the TCP/IP hostname, but does not have to be. If the -h option is not used, the dce_hostname will default to the long TCP/IP hostname (hostname_domain) of the local machine. When mkdce is call with -o local, the -h dce_hostname option should also be used with the same dce.hostname used by the cell administrator when mkdce was called with -o admin to configure the client machine. Otherwise the configuration will fail. If the cell administrator does not use the -h flag for the admin portion of configuration, the client is not required to use it either.

-i machine_identifier Specifies the TCP/IP hostname or TCP/IP address of the client machine being admin configured. When mkdce is called with -o admin, the -i option must also be used. Admin configuration can be used for a machine whose TCP/IP address is not yet registered with a nameserver. In this case, use the -h dce_hostname option with the -i IP_address option. Note: The -i option can only be used with the -o admin option.

-M max_UNIX_id Specifies the highest UNIX ID that can be assigned to principals, groups, or organizations by the Security Service. The default is 32767.

-n cell_name Specifies the name of the DCE cell into which the machine should be configured. If no -n option is specified, the mkdce command uses the cell name in the file /etc/dce/dce_cf.db. A value for cell_name is required by all components except rpc. It can either be in the form of /. . ./cellname or cellname.

-O min_org_id Specifies the starting point for UNIX Ids automatically generated by the Security Service when organizations are added with the rgy_edit command. The default is 100.

-o config_type Allows the cell administrator to split configuration by specifying admin, local, or full configuration of clients within the DCE cell.

the -o option has three available config_types:

admin Indicates the admin portion of client configuration. This updates the namespace and security registry with information about the new client. The admin pice of configuring a client requires the cell administrator to run the mkdce command from a machine within the existing cell. It should not be run from the new client machine. The cell administrator does not need root user authority to run the admin portion of configuration.

Note: When mkdce is called with -o admin, the -i option can be in the form, of a TCP/IP address or hostname (with or without the domain). The -h flag is optional. If both flags are used and the machine identifier (-i) is in the form of a TCP/IP hostname, host is called to get the IP address.

local Indicates the local portion of client configuration. This creates necessary files on the local machine and starts the dsemons for the new client. If the admin pice of mkdce has not yet been run, the local piece will fail when trying to contact the cell. In addition, the user must have root authority on the machine, and does not need to have any authority in the DCE cell.

Note: when mkdce is called with -o local, the -h dce_hostname option should be used with the same name that the cell administrator specified during admin configuration. If it is not, the dce_hostname will be presumed to be the same as the name of the machine (including domain, as returned from a call to the host command). If this is not the same as the dce_hostname the cell administrator used when setting up the client, the configuration will fall.

full indicates full configuration. This is the default. For full configuration, the DCE cell administrator must have root authority on the local machine to be configured into the cell.

-p profile Specifies the name of the LAN profile this machine should use. If the profile does not yet exist, it will be created. The default is /.:/lan-profile.

-P min_principal_id Specifies the starting point (minimum UNIX ID) for UNIX Ids automatically generated by the Security Service when principals are added with the rgy_edit command. The default is 100.

-R Configures the secd security daemon as a Security Replica, and not a Master Security Server. The sec_srv component must be specified when the -R option is used to locate the Master Security Server. The -s option is also needed when the -R option is used to locate the Master Security Server.

-r sec_replica_name Specifies the name to be given to the Security Replica. The default same dce_hostname will be used is a Security Replica is configured without specifying a name with the -r option. Each Security Repolica must have a unique name within the cell. Using the default name helps ensure this uniqueness.

-s security_server Specifies the hostname of the Master Security Server, you can use the TCP/IP hostname or the TCP/IP address of the Security server for this option. If no -s option is specified, the mkdce command uses the Security server in the file /opt/dcelocal/etc/security/pe_site. A value for the security_server is required by all components except rep and sec_srv. The -s option is needed when the -R option is used to configure a Security Replica.

-t time_courier_role Specifies the interaction the server should have with the global servers in the cell when configuring the DTS server (dts_local or dts_global component). The time_courier_role parameter must have one of the following values:

courier Always synchronize with one of the global servers.

backup Synchronize with one of the global servers if no couriers are available on the LAN.

noncourier Do not synchronize with global servers. This is the default vaue.

component Specifies the DCE components to be configured. Valid values are:

all_cl All clients (cds_cl, dts_cl, rpc, and sec_cl).

cds_cl CDS clerk.

cds_second Secondary CDS clerk. This component and cds_srv are mutually exclusive.

cds_srv Initial CDS server for the cell. This component and cds_second are mutually exclusive.

dts_cl DTS clerk. This component and dts_local and dts_global are mutually exclusive.

dts_global DTS global server. This component and dts_local and dts_cl are mutually exclusive.

dts_local DTS local server. This component and dts_global and dts_cl are mutually exclusive.

gda Global Directory Agent.

rpc RPC daemon (rpcd).

sec_cl Security client.

sec_srv Security Server (this component can be the Master Security Server for the cell or a Security Replica).

Usage

The mkdce command configures and starts, the specified DCE components. The command also configures and starts any prerequisite client components. The mkdce command only configures the core DCE components.

There are two ways to configure a machine into a cell:

Full configuration is used by the cell administrator (as root user) to complete all the configuration steps within the cell (updating the CDS namespace and the security registry) and on the local machine (creating files and starting daemons).

Split configuration breaks the configuration tasks into two distinct segments, admin and local. Admin configuration is used by the cell administrator from a machine currently configured in the cell to update the CDS namespace and the security registry with necessary information about the client. Local configuration allows the root user of the new client to create files local to the system and to start the DCE client daemons.

It is necessary to use full configuration for all servers, and full configuration can be used for clients. It is a common situation that the cell administrator does not have root user access for all the machines that are to be configured into the cell as client machines. In these circumstances, split configuration is the right option to choose. Full configuration is specified with the -o full option. Split configuration is specified with the -o admin and -o local options. The admin portion is run before the local portion.

When mkdce is called with -o admin, the -i identifier option is also needed to identify the machine to be configured as a client. The -i identifier option can be in the form of a TCP/IP address or a TCP/IP hostname with or without the domain. The -h dce_hostname flag is optional if the cell administrator wishes to specify the dce_hostname of the client machine. If the -i IP_address option is used without the -h option, the dce_hostname will be presumed to be the same as the TCP/IP hostname of the machine (including domain as returned from a call to the host command).

A cell administrator may want to configure new clients into a cell before actually having the client machines available or before the hostname and IP address are registered in the name server. The mkdce -o admin command, using the -i IP_address -h dce_hostname options will allow the namespace and security registry information to be updated without any calls to the nameserver for a machine not yet registered.

When mkdce is called with -o local, the client uses the dce_hostname used during admin configuration. If it is not the same, the configuration will fail. (If the cell administrator did not use the -h option, it is not necessary to use it for the local configuration, either.) If the cell name is not provided, a call to getcellname will determine if the local machine is already part of a cell. If it is, the assumption is made that additional client components are to be configured on this machine (for example, to add a CDS client to a machine with only a security client). If a cell name is not provided and the host is not already part of a cell, the configuration will fail. (For more information about using getcellname command, see the *DCE for OS/2 User's Guide and Reference*.)

When configuring the Master Security Server (the sec_srv component), mkdce will prompt for the password to be assigned to the initial accounts it creates in the registry database, including that of the cell administrator. When configuring most other components, this command will prompt for the password of the cell administrator's account so it can perform configuration tasks that require DCE authentication.

If the environment variable cell_admin_pw is set, mkdce uses its value for the cell administrator's password without prompting you. This feature can be useful when automating configuration tasks, but should be used sparingly because of the security risk it poses by making this password accessible to others. The cell administrator's password should be changed after the tasks are completed and the cell_admin_pw value is unset in order to limit the security risk.

If a requested component is already configured, the mkdce command reports this and continues configuring other components. After the command has completed running, the configured components are listed on the screen.

If a requested component is already partially configured, use the rmdce command to clean it up before using the mkdce command to configure that component.

To reconfigure a component with different parameters, use the rmdce command to remove the existing configuration before running the mkdce command to set up the new configuration.

If a machine has a component configured, and additional components are to be configured values for the -n, -s, -c and -p options do not need to be respecified. For example, if the Security client is already configured on a machine, the names of the cell (-n) and the Master Security Server (-s) are known, and it is not necessary to specify values for -n and -s again when configuring other DCE components on that machine.

The -h option is used to specify the dce_hostname for a machine configured into a cell. The dce_hostname is completely independent of the TCP/IP hostname of the machine. If the -h option is not specified, the dce_hostname will default to the TCP/IP hostname (including domain; for example, jus.sustin.ibm.com). The default clearinghouse for any cds_second servers will be dce_hostname_ch. A Security Replica name will also default to the dce_hostname if the -r option is not used.

Only one security Server (either a Master Security Server or a Security Replica) can run on a machine. The sec_srv component is used for both the Master Security Server and the Security Replica. The mkdce command will make sure that the security client (sec_clientd) and CDS client (cds_cl) are running on the machine before starting the security daemon (secd) when configuring a Security Replica.

The -R option of the sec_srv component is used to create a Security Replica rather than a Master Security Server. The -r option, when used, will specify the name to be given to the Security Replica. The default name (dce_hostname) will be used if a Security Replica is configured without specifying a name with the -r option. The recommended usage is to accept the default name.

The following sections provide detailed procedures for performing unconfiguration tasks.

ADMIN UNCONFIGURATION

As noted above, the purpose of admin unconfiguration is to unconfigure particular DCE components from a DCE cell without requiring access to the component host machine. Admin unconfiguration is desirable because the cell administrator does not have access to the host machine's root password, or it may be that the host machine has been physically disconnected from the DCE cell in some way. In either case, the DCE cell administrator needs to be able to update this cell to reflect the proper configuration.

Because admin unconfiguration can be used to clean up the DCE cell after an unsuccessful full configuration attempt, ALL unconfiguration tasks are attempted for each component requested to be unconfigured. If no tasks are found to be done, that fact is reported back to the user. If unconfiguration tasks are completed for a component, then the user is informed that the unconfiguration was completed successfully. The admin portion of unconfiguration removes the configuration information about the component from security registry and CDS namespace.

The -h <dce_hostname> flag is used to designate the host machine to be unconfigured. The dce_hostname is the name found in the path to the /.:/hosts/<dce_hostname>self object. It must be an exact match, no partial matches are supported.

Admin unconfiguration applies to all DCE components except for rpc, the dts client, the Master Security Server, and any CDS Server which has a master replica of a directory in its clearinghouse. The rpcd and the dts client has no information which needs to be updated in the security registry or CDS namespace of the DCE cell. An admin unconfiguration of the Master Security Server would disable the entire cell permanently, so is not allowed. Admin unconfiguration of a CDS server whose clearinghouse contains the master replica of a directory could mean that the directory was not recoverable, which could put the cell in an unstable state; therefore, we enforce that any master replicas be moved to another CDS server's clearinghouse before admin unconfiguration can take place.

LOCAL UNCONFIGURATION

The DCE daemons are stopped on the local machine, and the appropriate local files and directories are removed. When local unconfiguration has completed, the user gets a message reminding him that admin unconfiguration should also be run to clean up the DCE cell.

UNCONFIGURING DCE AND DFS COMPONENTS

The cell administrator should run the admin portion of unconfiguration from a machine in the cell to complete the unconfiguration process. Generally, one should exercise caution un unconfiguring DCE components, especially if removing components which perform services required by other components. Unconfiguring a component will partially or completely disable other components which are dependent upon it.

There are special cases which should be taken into consideration when unconfiguring DCE components:

The master Security server and the CDS server that contains the master replica of the /.:/directory are the basis of any cell. If one or both of these servers are unconfigured, the entire cell must be unconfigured and rebuilt.

To unconfigure a CDS server that has a master replica of any directory, the local option is used.

The Fileset Location Database is the basis of any cell's DFS system.

The rmdce command is used to remove configurations of DCE components. The rmdce command has a flag -o, with full, admin, or local as valid options. The rmdce command has a flag, -h <dce_hostname> to use with the -o admin option to identify which DCE host is to be unconfigured. The dce_hostname is the name found in the path to the /.:/hosts/<dce_hostname>/self object. The format of this command is set forth below.

Admin Remove Configuration rmdce -o admin -h dce_hostname [-a cell_admin ] [-F] [-g] components Local Remove Configuration rmdce -o local [-F] [-g] components Full Remove Configuration rmdce [-o full] [-a cell_admin] [-F] [-g] components

OPTIONS

-a cell_admin Specifies the name of the cell administrator's account. If no -a option is specified, the account cell_admin will be assumed.

-F Forces unconfiguration of components named on the command line, even if other components depend on their presence. This option should be used in clean-up situations and with caution, because a cell can be put into an unstable state.

-g Unconfigure dependent components. Specifies that any components that depend on those listed on the command line should also be unconfigured. For example, on a machine with sec_cl, cds_cl, and rpc, rmdce -g sec_cl will also unconfigure the cds_cl.

-h dce_hostname Used with the -o admin option to identify the dce_host to unconfigure. Use -h only when doing the admin portion of unconfiguration.

-o unconfig-type Used to specify what type of configuration should be done. The -o option has three available unconfig_types:

admin Specifies that the admin portion of unconfiguration will be completed for the dce_host indicated by the -h flag. This cleans up the CDS namespace and security registry. The user must have cell administrator authority within the cell.

local Specifies that the local portion of unconfiguration will be completed for the local machine. This stops the daemons and removes appropriate files. The user must have root authority on the local machine. Local configuration must be selected when unconfiguring the CDS Server whose clearinghouse contains a matter replica of a directory. Note: The -l option has the same meaning as -o local.

full Specifies full unconfiguration on the local machine. This is the default unconfig_type. When doing a full unconfiguration on the local host, the user must be the DCE cell administrator and have root authority on the local machine. Full unconfiguration is the equivalent of admin unconfiguration and local unconfiguration combined. If the -o or -l options are not used, a full unconfiguration will be assumed.

component Specifies the DCE components to be unconfigured. Valid values are:

all All DCE components.

all_cl All clients (cds_cl, dts_cl, rpc, and sec_cl).

all_srv All servers (cds_second, cds_srv, dts_global, dts_local, gda, sec_srv).

cds_cl CDS clerk.

cds_second Additional CDS server.

cds_srv Initial CDS server for the cell.

dts_cl DTS clerk.

dts_global DTS global server.

dts_local DTS local server.

gda Global Director Agent.

rpc RPC daemons (rpcd).

sec_cl Security client.

sec_srv Security Server (This component can be the Master Security Server for the cell or the Security Replica.)

Usage

The rmdce command stops the specified components and removes their configuration and database files. The rmdce command unconfigures only the core DCE components.

There are two ways to unconfigure a machine from a cell. Full unconfiguration is used by the cell administrator (as root user) to complete all the steps necessary both within the cell (updating the CDS namespace and security registry) and on the local machine (stopping the daemons and deleting files). If those steps are separated because the cell administrator will not have root access to the machine to be unconfigured, unconfiguration is divided into two parts, admin and local. Admin unconfiguration is used by the cell administrator on any machine within the cell to update the namespace and security registry about the changes in the cell; local unconfiguration is used by the root user on the machine being unconfigured to stop the daemons and delete appropriate files.

If the cell for which a machine is configured is inaccessible and you need to unconfigure the machine for any reason, use the -o local option. This option limits the rmdce command to remove only the local pieces of the DCE configuration; it does not remove entries from the namespace or registry database. To remove the entries from the namespace and registry database, the cell administrator should use the -o admin -h dce_hostname option from a machine within the cell.

Full configuration is specified by using the -o full option. The rmdce command also defaults to full unconfiguration if the -o option is not used at all.

Note: If you unconfigure the initial CDS server (with the master copy of the /.: directory) or Master Security Server in a cell, you will have to unconfigure the entire cell.

If the environment variable cell_admin_pw is set, rmdce uses its value for the cell administrator's password without prompting you. This feature can be useful when automating unconfiguration tasks, but should be used sparingly because of the security risk it poses by making this password accessible to others. The cell administrator's password should be changed after the tasks are completed and the cell_admin_pw value is unset in order to limit the security risk.

Whereas the mkdce command automatically configures any client components required by the specified components, the rmdce command will fail if configured components depend on the presence of those requested to be unconfigured. To unconfigure exactly those components specified on the command line, use the -F option. This option should be used with caution. In some cases, unconfiguring one component will disable other components that are dependent upon it. To unconfigure those components specified on the command line and all components that depend on them, use the -g option.

When a CDS server (either cds_srv or cds_second) is requested to be unconfigured, rmdce checks for several conditions. If full configuration is specified, rmdce checks to make sure that none of the clearinghouses on the server machine contain a master replica of any directory. If they do not, the unconfiguration continues. If they do, configuration exits with a message explaining what must be done before the server can be unconfigured. If it is necessary to unconfigure a CDS server with a clearinghouse that contains a master replica of a directory, rmdce may be run using the -o local option. After that, rmdce -o admin should be run from a machine within the cell.

Once a cds server has been unconfigured, it may not be possible to reconfigure it using the same dce_hostname until all updates have taken place in the cell. We recommend either using a different dce_hostname or waiting overnight before reconfiguring.

The rmdce command determines whether a Master Security Server or a Security Replica is configured on the local machine. When sec_srv is to be removed, rmdce will unconfigure the correct Security Server (Master or Replica). The replica's name will be retrieved from the Security Registry.

Note: If you unconfigure the Master Security Server in a cell, you will have to unconfigure and reconfigure the entire cell.

Security Replication adds more opportunities for the pe_site file to change; therefore, the pe_site file will be updated whenever rmdce is run (if the cdsadv daemon is running).

One of the preferred implementations of the invention is as a set of instructions in a code module resident in the random access memory of a computer. Until required by the computer, the set of instructions may be stored in another computer memory, for example, in a hard disk drive, or in a removable memory such as an optical disk )for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific operating system and network environment (OSF DCE), those skilled in the art will recognize that the invention can be practiced, with modification, in other and different operating systems and network architectures within the spirit and scope of the appended claims. The invention is not to be construed as limited to the OSF DCE architecture and thus in a more general sense the invention should be broadly construed to cover any network environment where it is desired to configure or unconfigure network resources.

Having thus described our invention, what we claim as new and desire to secure by Letters Patent is set forth in the following claims:

1. A method of configuring a machine into a distributed computing environment domain having at least two levels of authority, a first level authority normally restricted from root user access to machines in the domain, comprising the steps of:

identifying at least one of a set of configuration tasks that must be carried out by a root user on the machine being configured;

in response to entry into the domain of a password of the first level authority, performing an administrative configuration task in the domain for the machine being configured; and in response to entry of a root user password on the machine being configured, performing the at least one identified configuration task.

2. The method as described in claim 1 wherein the administrative configuration task is performed from a machine configured into the distributed computing environment.

3. The method as described in claim 2 wherein the administrative configuration task includes updating a cell directory service namespace.

4. The method as described in claim 2 wherein the administrative configuration task includes updating a security registry.

5. The method as described in claim 1 wherein the at least one identified configuration task includes creating one or more files needed by the machine being configured into the domain.

6. The method as described in claim 1 wherein the at least one configuration task includes starting at least one daemon.

7. A method of configuring a machine into a distributed computing environment domain controlled by an administrator normally restricted from root user access to machines in the domain, comprising the computer-implemented steps of:

identifying which of a plurality of configuration tasks must be carried out on the machine being configured into the distributed computing environment domain;

in response to entry into the domain of a password of the administrator, performing an administrative configuration task in the domain for the machine being configure, the administrative configuration task performed from a machine already configured into the domain; and in response to entry of a root user password on the machine being configured, performing the at least one identified configuration task.

8. A method of unconfiguring a machine from a distributed computing environment domain having at least two levels of authority, a first level authority normally restricted from root user access to machines in the domain, comprising the unordered steps of:

identifying at least one of a set of unconfiguration tasks that must be carried out by a root user on the machine un configured;

in response to entry of a root user password into the machine being unconfigured, performing the at least one identified unconfiguration task; and in response to entry into the domain of a password of the first level authority, performing an administrative configuration task in the domain for the machine being unconfigured.

9. The method as described in claim 8 wherein the administrative unconfiguration task is performed from a machine in the distributed computing environment.

10. The method as described in claim 8 wherein the administrative unconfiguration task includes updating a cell directory service namespace to delete information about the machine being unconfigured from the domain.

11. The method as described in claim 8 wherein the administrative unconfiguration task includes updating a security registry to delete information about the machine being unconfigured from the domain.

12. The method as described in claim 8 wherein the at least one unconfiguration task includes deleting one or more files used by the machine being unconfigured from the domain.

13. The method as described in claim 8 wherein the at least unconfiguration task includes stopping at least one daemon.

14. A method of unconfiguring a machine from a distributed computing environment domain controlled by an administrator normally restricted from root user access to machines in the domain, comprising the computer-implemented unordered steps of:

identifying at least one of a set of unconfiguration tasks that must be carried out by a root user on the machine being un configured;

in response to entry of a root user password on the machine being configured, performing the at least one identified unconfiguration task; and in response to entry into the domain of a password of the first level authority, performing an administrative unconfiguration task in the domain for the machine being unconfigured, the administrative unconfiguration task being performed in a machine in the domain.

15. In a computer network providing a distributed computing environment domain in which users can access distributed resources, the computer network having a first machine configured into the domain and a second machine to be configured into the domain, and wherein a first level authority of the domain is normally restricted from root user access to machines in the domain, the improvement comprising:

means, responsive to entry into the domain of a password of a first level authority, for performing an administration configuration task on the first machine; and means, responsive to entry of a root user password on the second machine, for performing at least one configuration task on the second machine.

16. In a computer network providing a distributed computing environment domain in which users can access distributed resources, the computer network having a first machine configured into the domain and a second machine that is to be unconfigured from the domain, and wherein a first level authority of the domain is normally restricted from root user access to machines in the domain, the improvement comprising:

means, responsive to entry into a domain of a password of a first level authority, for performing an administration unconfiguration task on the first machine; and means, responsive to entry of a root user password on the second machine, for performing at least one unconfiguration task on the second machine.

17. A computer system for use in a distributed computing environment domain, the domain having a first level authority normally restricted from root user access to machines in the domain, comprising:

means for splitting configuration tasks into first and second sets of tasks, each of the first and second sets including at least one configuration task;

means, responsive to entry into the domain of a password of the first level authority, for performing the first set of tasks; and means, responsive to entry of a root user password, for performing the second set of tasks.

18. A computer system for use in a distributed computing environment domain, the domain having a first level authority normally restricted from root user access to machines in the domain, comprising:

means for splitting unconfiguration tasks into first and second sets of tasks, each of the first and second sets including at least one unconfiguration task;

means, responsive to entry into the domain of a password of the first level authority, for performing the first set of tasks; and means, responsive to entry of a root user password, for performing the second set of tasks.

19. A program storage device readable by a processor and tangibly embodying a program of instructions executable by the processor to perform a method of configuring a resource into a distributed computing environment domain, the domain having at least two levels of authority, a first level authority normally restricted from root user access to machines in the domain, the method comprising the unordered steps of:

identifying at least one of a set of configuration tasks that must be carried out by a root user on the machine being configured;

performing an administrative configuration task in the domain for the machine being configured; and in response to entry of a root user password, performing, under root user authority, the at least one identified configuration task.

* * * * *

UNITED STATES PATENT AND TRADEMARK OFFICE
CERTIFICATE OF CORRECTION

PATENT NO. : 5,784,612

DATED : July 21, 1998

INVENTOR(S) : Christina Heidi Crane; Edwin Michael Philpot, Jr.; Stephna Jeanne Sirkin; and Kenneth Walker, Jr.

It is certified that error appears in the above-identified patent and that said Letters Patent is hereby corrected as shown below:

In Claim 7, line 65, delete "configure" and substitute --configured--

Signed and Sealed this

Seventeenth Day of August, 1999

Q. TODD DICKINSON

Attest:

Attesting Officer

Acting Commissioner of Patents and Trademarks

UNITED STATES PATENT AND TRADEMARK OFFICE
CERTIFICATE OF CORRECTION

PATENT NO : 5,784,612
DATED : July 21, 1998
INVENTOR(S) : Crane, et al.

It is certified that error appears in the above-identified patent and that said Letters Patent is hereby corrected as shown below:

In Claim 7, line 65, change "configure" to --configured--.

Signed and Sealed this

Sixth Day of February, 2001

Attest:

Q. TODD DICKINSON

Attesting Officer

Director of Patents and Trademarks